(12) United States Patent
Seo et al.

(10) Patent No.: US 11,618,460 B1
(45) Date of Patent: Apr. 4, 2023

(54) PREDICTIVE PLANNING

(71) Applicant: PlusAI, Inc., Cupertino, CA (US)

(72) Inventors: Hyoungju Seo, Cupertino, CA (US);
Xiaoyu Huang, San Jose, CA (US)

(73) Assignee: PlusAI, Inc., Cupertino, CA (US)

( * ) Notice: Subject to any disclaimer, the term of this patent is extended or adjusted under 35 U.S.C. 154(b) by 0 days.

(21) Appl. No.: 17/844,628

(22) Filed: Jun. 20, 2022

(51) Int. Cl.
*B60W 50/00* (2006.01)
*B60W 60/00* (2020.01)

(52) U.S. Cl.
CPC .... *B60W 50/0097* (2013.01); *B60W 60/0027* (2020.02); *B60W 2554/40* (2020.02)

(58) Field of Classification Search
None
See application file for complete search history.

(56) References Cited

U.S. PATENT DOCUMENTS

| | | | |
|---|---|---|---|
| 2018/0356830 A1 | 12/2018 | Haghighat et al. | |
| 2019/0355245 A1* | 11/2019 | Gigengack | G08G 1/04 |
| 2021/0163000 A1 | 6/2021 | Dieckmann et al. | |
| 2021/0403034 A1* | 12/2021 | Lapin | B60W 60/0011 |
| 2022/0105934 A1 | 4/2022 | Shieh | |
| 2022/0219691 A1* | 7/2022 | Maleki | G06F 11/0793 |

OTHER PUBLICATIONS

Shalev-Shwartz, Shai, et al., "Vision Zero: Can Roadway Accidents be Eliminated without Compromising Traffic Throughput?", Mobileye, 2018 (Year: 2018), 7 pages.

* cited by examiner

*Primary Examiner* — Tamara L Weber
(74) *Attorney, Agent, or Firm* — Sheppard Mullin Richter & Hampton LLP

(57) ABSTRACT

Methods, systems, and non-transitory computer-readable media are configured to perform operations comprising acquiring data regarding historical movement of a lead obstacle and one or more obstacles in front of the lead obstacle; predicting movement of at least the lead obstacle based at least in part on the data; and applying the predicted movement of the lead obstacle to an optimizable function associated with movement of an ego vehicle.

20 Claims, 9 Drawing Sheets

Vehicle 800

Autonomous System 810

Perception Module 812

Prediction and Planning Module 816

Localization Module 814

Control Module 818

Data Store 820

PREDICTIVE PLANNING

FIELD OF THE INVENTION

The present technology relates to autonomous systems. More particularly, the present technology relates to predictive planning and adaptive vehicle following distance.

BACKGROUND

An autonomous system for navigation of a vehicle can plan and execute motion for the vehicle. The planning and execution functions of the autonomous system rely on data about the vehicle and an environment in which the vehicle is traveling. The environment of the vehicle can include movement of other vehicles. The performance of the planning and execution functions can depend on such data as the state of the vehicle and the conditions of the environment change.

SUMMARY

Various embodiments of the present technology can include methods, systems, and non-transitory computer readable media configured to perform operations comprising acquiring data regarding historical movement of a lead obstacle and one or more obstacles in front of the lead obstacle; predicting movement of at least the lead obstacle based at least in part on the data; and applying the predicted movement of the lead obstacle to an optimizable function associated with movement of an ego vehicle.

In some embodiments, the predicted movement of the lead obstacle includes predicted speed of the lead obstacle.

In some embodiments, the operations further comprise generating a plan for movement of the ego vehicle based on minimization of the optimizable function; and controlling the ego vehicle based on the plan.

In some embodiments, the predicting is based on a model that generates at least a speed profile of the lead obstacle.

In some embodiments, the model assumes that the lead obstacle and the one or more obstacles in front of the lead obstacle have the same velocity at the same location.

In some embodiments, the data includes distances and velocities of the lead obstacle and distances and velocities of the one or more obstacles in front of the lead obstacle over a duration of time, and the model is a learning based algorithm that is trained based on the data.

In some embodiments, the predicted movement of the lead obstacle is based on a function determined by the data, the predicted movement associated with a time following the duration of time.

In some embodiments, the optimizable function includes i) a safety term based at least in part on a difference between a preferred following distance and an obstacle distance and ii) a traffic term based at least in part on a difference between a velocity of the ego vehicle and a traffic target speed.

In some embodiments, the safety term is weighted by a constant value and the traffic term is weighted by a value inversely related to a headway distance.

In some embodiments, the lead obstacle and the one or more obstacles in front of the lead obstacle are vehicles traveling in an ego lane.

Various embodiments of the present technology can include methods, systems, and non-transitory computer readable media configured to perform operations comprising determining a lead obstacle in front of an ego vehicle; determining an optimizable function associated with an optimized preferred following distance between the ego vehicle and the lead obstacle; and generating the optimized preferred following distance based on the optimizable function.

In some embodiments, the optimized preferred following distance is based on minimization of the optimizable function.

In some embodiments, the optimized preferred following distance is greater than or equal to a minimum safe distance.

In some embodiments, the optimizable function includes a term associated with driving comfort and a term associated with cost.

In some embodiments, the term associated with driving comfort relates to jerkiness and the term associated with cost relates to fuel efficiency.

In some embodiments, the term associated with driving comfort and the term associated with cost are functions of current situation information, the current situation information including position, velocity, and acceleration of the ego vehicle and the lead obstacle.

In some embodiments, the optimizable function includes a sum of the term associated with driving comfort and the term associated with cost.

In some embodiments, the operations further comprise generating a plan for movement of the ego vehicle based on minimization of the optimizable function; and controlling the ego vehicle based on the plan.

In some embodiments, the optimized preferred following distance is an adapted APB distance.

In some embodiments, the optimized preferred following distance is an adapted APB distance that is smaller than an APB distance.

It should be appreciated that many other embodiments, features, applications, and variations of the present technology will be apparent from the following detailed description and from the accompanying drawings. Additional and alternative implementations of the methods, non-transitory computer readable media, systems, and structures described herein can be employed without departing from the principles of the present technology.

Figure 1:
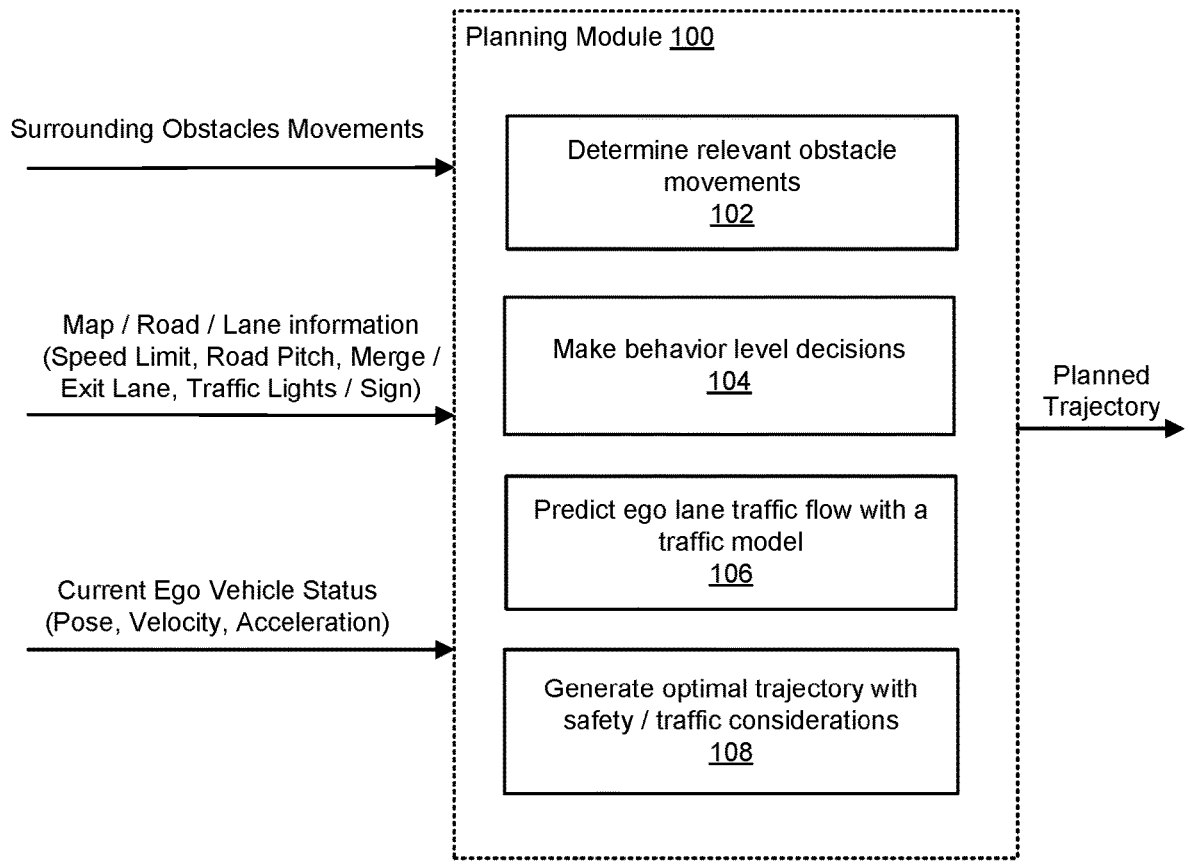
FIG. 1 illustrates an example planning module associated with predictive planning, according to embodiments of the present technology.

The figures depict various embodiments of the present technology for purposes of illustration only, wherein the figures use like reference numerals to identify like elements. One skilled in the art will readily recognize from the following discussion that alternative embodiments of the structures and methods illustrated in the figures can be employed without departing from the principles of the present technology described herein.

DETAILED DESCRIPTION

Predictive Planning

An autonomous system for navigation of a vehicle (e.g., ego vehicle), such as a truck, can perform planning and control functions. The planning functions can generate optimal, safe navigation routes for navigation of the ego vehicle. The planning functions rely on an understanding of the ego vehicle and an environment in which the ego vehicle is traveling.

An environment of an ego vehicle often includes other moving vehicles. A planning system of a conventional autonomous system of the ego vehicle in typical cases focuses primarily on the vehicle directly ahead of (e.g., leading) the ego vehicle. Accordingly, in the conventional planning system, planning of ego vehicle movement relies heavily on the lead vehicle with little, if any, consideration of vehicles ahead of the lead vehicle. In essence, the lead vehicle is viewed as a standalone vehicle. As a result, the ego vehicle can be unduly reactive to movement of the lead vehicle, resulting in frequent and excessive braking and throttling by the ego vehicle. Such action by the ego vehicle can pose significant disadvantages in terms of costs, such as fuel inefficiency and actuator subsystem deterioration, and driving comfort. When vehicles ahead of the lead vehicle are considered at all by a conventional planning system, they tend to be considered in isolated instances. In this regard, a conventional planning system in some instances might account for vehicles ahead of the lead vehicle only in a particular circumstance related to safety. Many conventional planning systems thus fail to consistently and systematically evaluate movement of vehicles ahead of the lead vehicle. This failure by conventional planning systems precludes an accurate understanding of the entirety of a traffic situation in the environment of the ego vehicle.

The present technology provides improved approaches for predictive planning of movement (e.g., longitudinal movement) by an autonomous system for navigation of an ego vehicle, such as a truck. In the present technology, movement of a plurality of obstacles (e.g., vehicles) ahead of an ego vehicle is analyzed to acquire a more accurate understanding of a traffic situation experienced by the ego vehicle. A traffic model of a plurality of traffic models can be utilized to predict movement of a lead obstacle and other obstacles in an ego lane in which the ego vehicle is traveling. In the plurality of traffic models, movement of one or more obstacles ahead of the lead obstacle can be considered to predict movement of at least the lead obstacle. Based on the predicted movement of the lead obstacle in this manner, movement of the ego vehicle can be planned by the autonomous system. An optimizable objective function, such as a cost function, relating to movement of the ego vehicle can be based on predicted movement of the lead obstacle. Planned movement of the ego vehicle can be determined based on optimization (e.g., minimization) of the objective function. Because predicted movement of the lead obstacle accounts for movement of obstacles ahead of the lead obstacle, the planning function of the autonomous system can reflect a more comprehensive understanding of traffic conditions involving all relevant obstacles. As a result, frequent or excessive braking and throttling by the ego vehicle that would otherwise result from focus on movement of the lead obstacle alone can be avoided. Moreover, the significant costs relating to such frequent or excessive braking and throttling, such as fuel inefficiency and actuator subsystem degradation, can be eliminated. These and other inventive features and related advantages of the various embodiments of the present technology are discussed in more detail herein.

FIG. 1 illustrates an example planning module 100 of an autonomous system of a vehicle (e.g., ego vehicle), according to some embodiments of the present technology. In some embodiments, the planning module 100 can be implemented in an autonomous system of any type of vehicle, such as an autonomous vehicle. The planning module 100 can predict ego lane traffic flow involving all relevant obstacles (e.g., vehicles) in front of the ego vehicle based on a traffic model. The planning module 100 can generate a planned trajectory for an ego vehicle based on predictive planning. The planned trajectory of the ego vehicle can be based on an optimization of an objective function (or cost function) that accounts for traffic considerations and safety considerations.

In some embodiments, some or all of the functionality performed by the planning module 100 may be performed by one or more computing systems implemented in a vehicle. In some embodiments, some or all of the functionality performed by the planning module 100 may be performed by one or more backend computing systems. In some embodiments, some or all of the functionality performed by the planning module 100 may be performed by one or more computing systems associated with (e.g., carried by) one or more users riding in a vehicle. In some embodiments, some or all data processed and/or stored by the planning module 100 can be stored in a data store (e.g., local to the planning module 100) or other storage system (e.g., cloud storage remote from the planning module 100). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the planning module 100 can be implemented in any suitable combinations. Functionalities of the planning module 100 or variations thereof may be further discussed herein or shown in other figures.

As referenced or suggested herein, autonomous vehicles can include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, based on the SAE standard, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode. As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

At block 102, the planning module 100 can determine movement and relevance of obstacles (or objects) in an environment of an ego vehicle. The determination of relevance can be based on information about the obstacles and their movements. For example, the planning module 100 can determine the number of obstacles and the current position, velocity, and acceleration of each obstacle in the environment of the vehicle based on data captured by sensors, as well as their predicted trajectories.

Based on such information, the planning module 100 can rate the obstacles in connection with their relevance to the ego vehicle. In this regard, the rating of the obstacles can be based on, for example, an algorithmic rating system. The rating system can generate ratings reflecting predicted likelihoods that the obstacles will encounter (e.g., approach, collide with) the ego vehicle or otherwise take undesirable action in relation to the ego vehicle. As just one example, an obstacle that is predicted to collide with the ego vehicle can have a relatively high rating while another obstacle that is predicted to move in a direction away from the ego vehicle can have a relatively low rating. Obstacles having a rating that satisfies a threshold rating value can be considered in planning by the planning module 100.

At block 104, the planning module 100 can make behavior level decisions. Behavior level decisions can be associated with desired behavior of the ego vehicle while traveling in the environment. Behavioral level decisions can be based on various types of information, such as map information, road information, and lane information. In particular, such information can include, for example, velocity limit, road pitch, merge lane, exit lane, traffic lights, traffic signs, etc. Based on this information and information relating to obstacles in the environment of the ego vehicle that have been determined to be relevant, the planning module 100 can select appropriate behavioral actions to navigate the ego vehicle. Behavioral actions can include, for example, lane following, lane changing, merging, and nudging.

At block 106, the planning module 100 can utilize a traffic model of a plurality of traffic models to predict ego lane traffic flow. Ego lane traffic flow can include or be associated with movement of a lead obstacle ahead of the ego vehicle as well as other obstacles ahead of the lead obstacle. A plurality of traffic models can be used by the planning module 100 to predict movement of at least the lead obstacle based on movement of obstacles ahead of the lead obstacle. In some embodiments, a first traffic model of the plurality of traffic models can predict ego lane traffic flow in a deterministic manner. In some embodiments, a second traffic model of the plurality of traffic models can predict ego lane traffic flow by utilizing a learning based algorithm. The traffic models are discussed in more detail herein.

At block 108, the planning module 100 can generate a planned trajectory for the vehicle. The planned trajectory can account for safety considerations. In accordance with the present technology, the planned trajectory also can account for traffic considerations and related driving comfort associated with predicted ego lane traffic flow as determined by a traffic model at block 106. The planned trajectory can be based on current ego vehicle status, such as pose, velocity, and acceleration of the ego vehicle. In addition, the planned trajectory can be determined based in part on optimization of an objective function associated with movement by the ego vehicle. The objective function can be based on safety considerations and traffic considerations and related driving comfort. The objective function is discussed in more detail herein. The planned trajectory can be provided to a control function of the autonomous system to command actuators of the ego vehicle to execute movement of the ego vehicle as planned.

Figure 2:
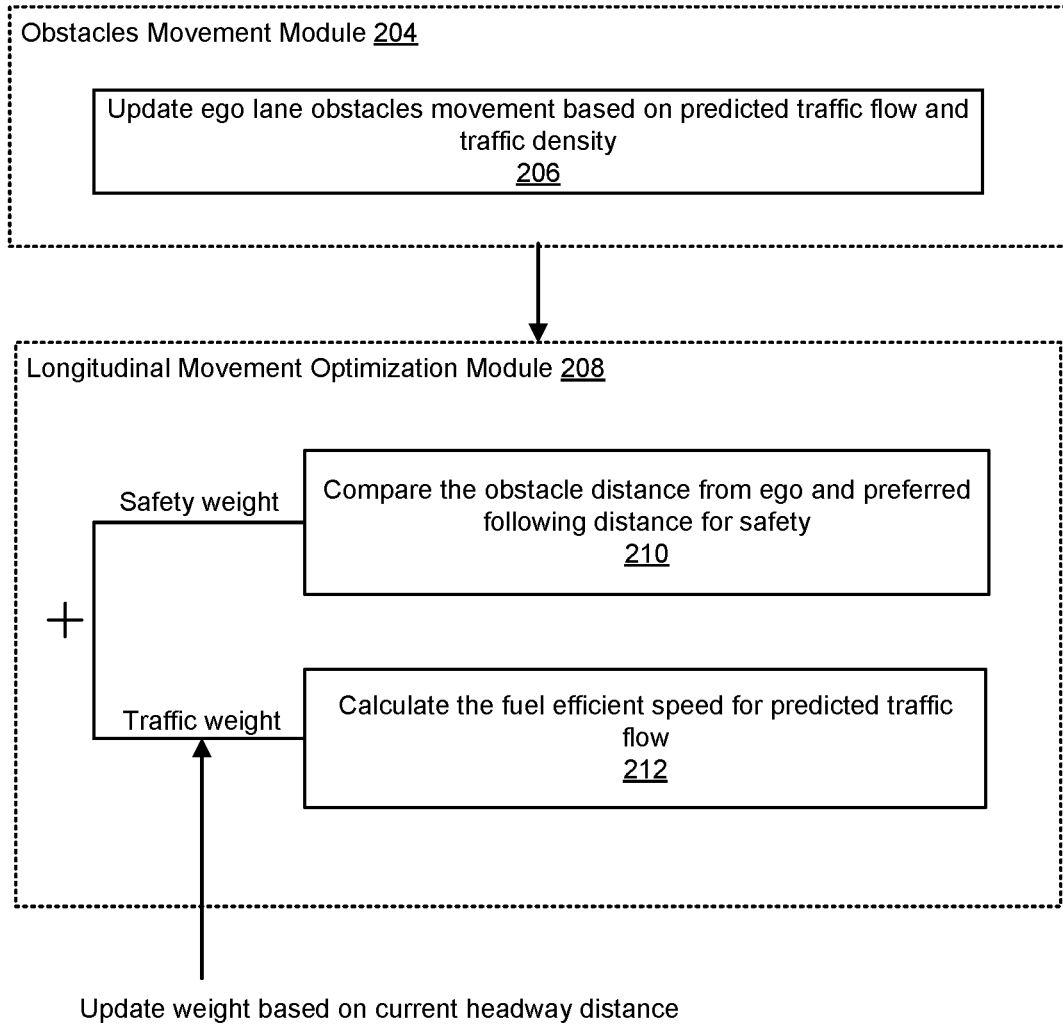
FIG. 2 illustrates an example planning module including associated submodules, according to embodiments of the present technology.

FIG. 2 illustrates relevant portions of an example planning module 200, according to some embodiments of the present technology. In some embodiments, relevant functions of the planning module 100 of FIG. 1 can be implemented by the planning module 200. For example, relevant functions of block 106 and block 108 of the planning module 100 can be implemented by, respectively, an obstacles movement module 204 and a longitudinal movement optimization module 208 of the planning module 200.

At step 206 of the obstacles movement module 204, information regarding movement of ego lane obstacles (or objects) can be updated based on predicted traffic flow and traffic density. In an environment being traveled by an ego vehicle, a lead obstacle (e.g., lead vehicle) may be traveling directly in front of the ego vehicle in an ego lane. Obstacles ahead of the lead obstacles can be considered additional ego lane obstacles. A prediction of traffic flow and traffic density with which movement of the obstacles is associated can be based on a traffic model. The traffic model can be one of a plurality of traffic models. The plurality of traffic models can determine, for example, distances and velocities (or speeds) of obstacles in the ego lane. For example, the plurality of traffic models can consider movement of other obstacles in the ego lane to predict the movement of the lead obstacle.

A first type of traffic model can determine movement of ego lane obstacles in a deterministic manner. For example, the first type of traffic model can predict distances and velocities of the obstacles. In this regard, the first type of traffic model can assume or predict that the obstacles travel at the same velocity (or speed) at the same location. Accordingly, the first type of traffic model can predict that the velocities of the obstacles as they reach the same point in the ego lane will be the same velocity. In some embodiments, the first type of traffic model can have variations. In a more complex variation of the first type of traffic model, the obstacles are not merely assumed to have the same velocity at the same location. In the more complex variation of the first type of traffic model, the traffic model also can assume or predict the existence of a safe following distance between two obstacles. Other variations of the first type of traffic model are possible.

A second type of traffic model can determine movement of ego lane obstacles from a learning based algorithm. The learning based algorithm can be implemented by any suitable learning based algorithm. In some embodiments, the learning based algorithm can be implemented by a machine learning model, such as a supervised machine learning model or an unsupervised machine learning model. The learning based algorithm can be trained based on input data captured by sensors that relate to the obstacles and their past movement.

The learning based algorithm can be trained to output predicted movement of one or more of the obstacles. For example, the learning based algorithm can be trained to output predicted distances and velocities of the obstacles. In some embodiments, the learning based algorithm can be trained to output at least a velocity (or speed) profile of a lead obstacle in front of an ego vehicle. Input data (or training data) to train the learning based algorithm can include, for example, the historical distances and velocities of the lead obstacle over a past duration of time (e.g. five minutes). Further, in this example, the input data can include the historical distances and velocities of obstacles ahead of the lead obstacle over the past duration of time. Based on such input data, the learning based algorithm can generate a function into which the input data can fit. The function can describe the velocity of the lead obstacle. Accordingly, the velocity of the lead obstacle at a time after the past duration of time (e.g., five seconds after the five minutes) can be predicted based on the learning based algorithm. In accordance with the present technology, the predicted velocity of the lead obstacle thus advantageously and realistically accounts for movement of obstacles in front of the lead obstacle.

In some embodiments, a learning based algorithm can be configured to predict not only distances and velocities of a lead obstacle but also distances and velocities of obstacles in front of the lead obstacle. Such predicted movement of all relevant obstacles can provide a better understanding of the entirety of traffic flow. Input data can be collected to train the learning based algorithm to predict velocities of all of the obstacles. For example, to train the learning based algorithm to generate predictions of velocities of a lead obstacle, the input data (or training data) can include the historical distances and velocities of the lead obstacle over a prior duration of time. In addition, the input data can include the historical distances and velocities of obstacles ahead of the lead obstacle over the prior duration of time. Likewise, to train the learning based algorithm to generate predictions of velocities of a first obstacle directly ahead of a lead obstacle, the input data (or training data) can include the historical distances and velocities of the first obstacle over a prior duration of time. In addition, the input data can include the historical distances and velocities of obstacles ahead of first obstacle over the prior duration of time. In a similar manner, to train the learning based algorithm to generate predictions of velocities of a second obstacle directly ahead of the first obstacle, the input data (or training data) can include the historical distances and velocities of the second obstacle over a selected duration of time. In addition, the input data can include the historical distances and velocities of obstacles ahead of the second obstacle over the selected duration of time. In the manner described, the learning based algorithm can predict the velocities of additional obstacles through similar input data. By determining velocity predictions for all relevant obstacles including the lead obstacle, the learning based algorithm can provide a more comprehensive understanding of traffic flow that can further optimize vehicle planning.

The longitudinal movement optimization module 208 can optimize planned movement of the ego vehicle. The longitudinal movement optimization module 208 can be used to generate an optimal trajectory that accounts for safety considerations and traffic considerations. At block 210, the longitudinal movement optimization module in relation to safety considerations can compare two values: i) distance of the lead obstacle from the ego vehicle and ii) a preferred following distance. The comparison of the distances can be combined (e.g., multiplied) with a safety weight to generate a safety term. At block 212, the longitudinal movement optimization module 208 in relation to traffic considerations and related comfort can calculate a fuel efficient velocity of the ego vehicle for predicted traffic flow. The fuel efficient velocity of the ego vehicle can be combined (e.g., multiplied) with a traffic weight to generate a traffic term. The traffic weight can vary based on current headway distance, which is the current distance between the ego vehicle and the lead obstacle. The longitudinal movement optimization module 208 can combine (e.g., add) the safety term and the traffic term.

The combination of the safety term and the traffic term can be included in an optimizable objective function associated with movement of the ego vehicle. In some embodiments, the objective function can be a cost function. As a cost function, the objective function can be minimized in order to plan movement by the ego vehicle. The presence of the traffic term in the objective function enables the planning module 200 to account for traffic considerations and related comfort in planning ego vehicle movement. As a result, ego vehicle movement exhibiting optimal, reduced braking and throttling can be advantageously planned and executed.

In some embodiments, the longitudinal movement optimization module 208 can determine the objective function. For example, the objective function can be expressed as follows:

$$\mathrm{argmin}_{ego\_move}$$
$$\{w_{safety}*|preferred\_following\_distance-obs\_distance|/preferred\_following\_distance+$$
$$w_{traffic}*|ego\_v-traffic\_target\_speed|/ego\_v\},$$

s.t $w_{traffic}$=f(headway_disance ),
obs_distance=g(traffic_flow, traffic_density),
traffic_target_speed=h(traffic_flow, traffic_density).
where:

$w_{safety}$ can be weight having a selected constant value;
preferred_following_distance can be a preferred following distance between an ego vehicle and a lead obstacle (e.g., lead vehicle) that is calculated based on a suitable technique, as discussed herein;
obs_distance can be a distance in the future between the ego vehicle and the predicted position of the lead obstacle; obs_distance can be determined based on a function g of traffic_flow and traffic_density; and, obs_distance and the function g to determine obs_distance can be based on a traffic model, as discussed herein;
$w_{traffic}$ can be a weight having an updatable value; and, $w_{traffic}$ can be a function f of headway_distance and inversely related to headway_distance;
headway_distance can be a distance between the ego vehicle and the current position of the lead obstacle;
ego_v can be velocity of the ego vehicle;
traffic_target_speed can be a function h of traffic_flow and traffic_density; traffic_target_speed and the function h to determine traffic_target_speed can be based on a traffic model, as discussed herein; and, traffic_target_speed can be equal to predicted speed of the lead obstacle;
traffic_flow can be a value of traffic velocity; and
traffic_density can be a count of obstacles.

As can be observed from the foregoing objective function, different approaches can minimize the objective function in different ways. For example, decreasing a difference between preferred_following_distance and obs_distance can decrease the safety term in the objective function. Accordingly, planning ego vehicle movement that causes obs_distance to be near or equal to preferred_following_distance can be advantageous. Similarly, decreasing a difference between ego_v and traffic_target_velocity can decrease the traffic term in the objective function. Accordingly, planning ego vehicle movement that causes ego_v to be near or equal to traffic_target_velocity can be advantageous. As another example, the objective function can minimize the traffic flow effect if headway_distance is out of a desired safe distance boundary. In some embodiments, other objective functions based on similar or other terms or considerations can be utilized by the longitudinal movement optimization module 208. In some embodiments, preferred_following_distance can be an adapted APB distance (or APB distance) as discussed in connection with FIGS. 5-7.

Figure 3:
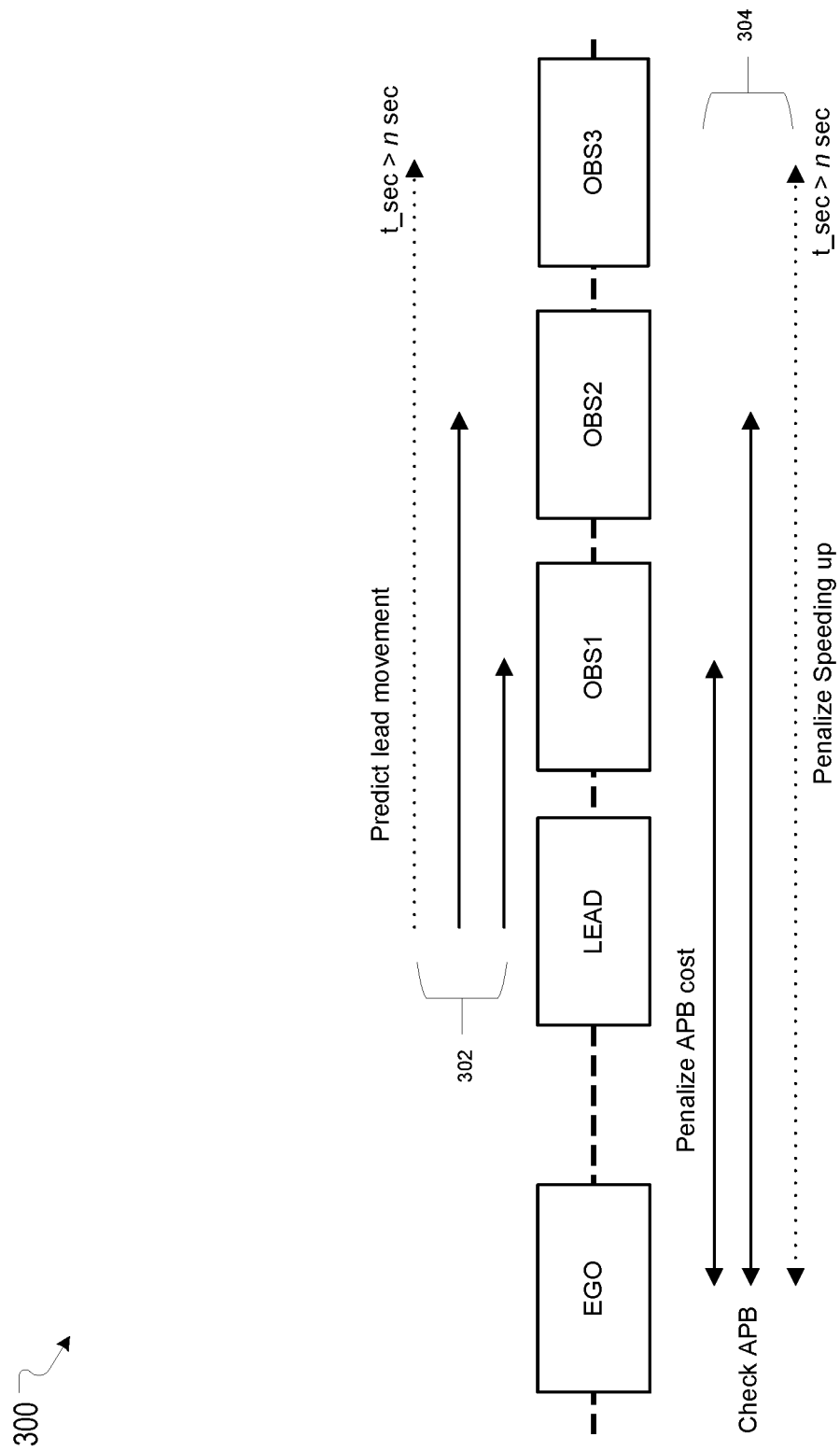
FIG. 3 illustrates an example of predictive planning, according to embodiments of the present technology.

FIG. 3 illustrates an example 300 of predictive planning, according to some embodiments of the present technology. The example includes an ego vehicle ("Ego") in which an autonomous system for navigation is implemented. The ego vehicle is traveling in an ego lane. In the ego lane, a lead obstacle ("Lead") is directly ahead of the ego vehicle. In the ego lane, three obstacles ("Obs1", "Obs2", "Obs3") are ahead of the lead obstacle. Lines 302 relate to predicted movement of the lead obstacle. The predicted movement (e.g., velocity) of the lead obstacle can be based on a traffic model of a planning function of the autonomous system, as described herein. The traffic model can consider movement of the three obstacles ahead of the lead obstacle in predicting velocity (or speed) of the lead obstacle. As one example, the predicted movement of the lead obstacle can be determined from the first type of traffic model based on a deterministic approach. As another example, predicted movement of the lead obstacle can be determined from the second type of traffic model based on a learning based algorithm. The predicted movement of the lead obstacle as shown can reflect movement over a selected duration of time (e.g., greater than 5 seconds).

A planning module of the autonomous system can select an objective function associated with movement of the ego vehicle that is to be minimized. In some embodiments, the selected objective function can be the objective function discussed above in connection with the longitudinal movement optimization module 208. Lines 304 relate to determinations made by the planning module based on the objective function. The determinations made by the planning module can be based on various data as applied to the objective function. In this regard, a preferred following distance between the ego vehicle and the lead vehicle can be determined. For example, the preferred following distance can be an automatic preventative braking (APB) distance, as shown. Based on the preferred following distance, the planning module can evaluate the objective function and, in particular, the safety term of the objective function. As provided in the safety term of the objective function, the preferred following distance and obs_distance can be compared. When obs_distance is less than the preferred following distance, the resulting cost is penalized in planning ego vehicle movement. In addition, the planning module can evaluate the objective function and, in particular, the traffic term of the objective function. As provided in the traffic term of the objective function, ego_v and traffic_target_velocity can be compared. When ego_v becomes greater than traffic_target_velocity, the resulting cost is penalized in planning ego vehicle movement.

Other examples can illustrate advantages of predictive planning in accordance with the present technology. For instance, assume a lead obstacle (e.g., lead vehicle) from another lane has cut into an ego lane in front of an ego vehicle. Assume further that other obstacles are traveling in the ego lane ahead of the lead obstacle. In conventional autonomous systems, the lead obstacle may be considered in isolation without regard to the existence of the other obstacles ahead of the lead obstacle. As a result, conventional autonomous systems may assume that the lead obstacle will continue traveling in the ego lane at the velocity with which the lead obstacle cut into the ego lane. In reality, however, the lead obstacle may actually slow down (or speed up) to match the velocities of the other obstacles that are traveling more slowly (or more quickly). Because conventional autonomous systems typically consider the lead obstacle in isolation, they accordingly would plan for the ego vehicle to match the velocity with which the lead obstacle cut into the ego lane to avoid collision with the lead obstacle. For example, with such a plan, the ego vehicle would need to apply excessive braking when the lead obstacle slows down to match the velocities of the other obstacles that are traveling more slowly. Thus, plans generated by conventional autonomous systems can result in excessive or unnecessary braking by the ego vehicle.

In contrast, the present technology utilizes predictive planning based on a traffic model to more reliably predict motion of the lead obstacle. As discussed, the traffic model can consider data about other obstacles ahead of the lead obstacle to better predict movement of the lead obstacle. Based on the traffic model, the lead obstacle is not necessarily assumed to slow down after the cut in. Instead, in some instances, the traffic model can predict that the velocity of the lead obstacle will remain relatively steady or even increase when the velocities of the obstacles in front of the lead obstacle remain steady or increase. In these instances, if movement of the ego vehicle was to quickly slow down after the cut in by the lead obstacle, such movement by the ego vehicle would be penalized by the objective function associated with ego vehicle movement. Based on the predicted movement of the lead obstacle as determined by the traffic model and minimization of the objective function, the velocity of the ego vehicle in such instances instead would be planned to only slightly slow down or remain unchanged. As a result, the planned movement of the ego vehicle avoids excessive or unnecessary braking (and eventual need for throttling) otherwise required by conventional autonomous systems, achieving significant advantages relating to increased fuel efficiency, decreased maintenance costs, and decreased jerkiness while maintaining safety. The foregoing example is merely illustrative. Predictive planning in accordance with present technology can be advantageous in a wide variety of traffic conditions to optimize ego vehicle movement that significantly conserves costs and increases driving comfort while maintaining safety.

Figure 4:
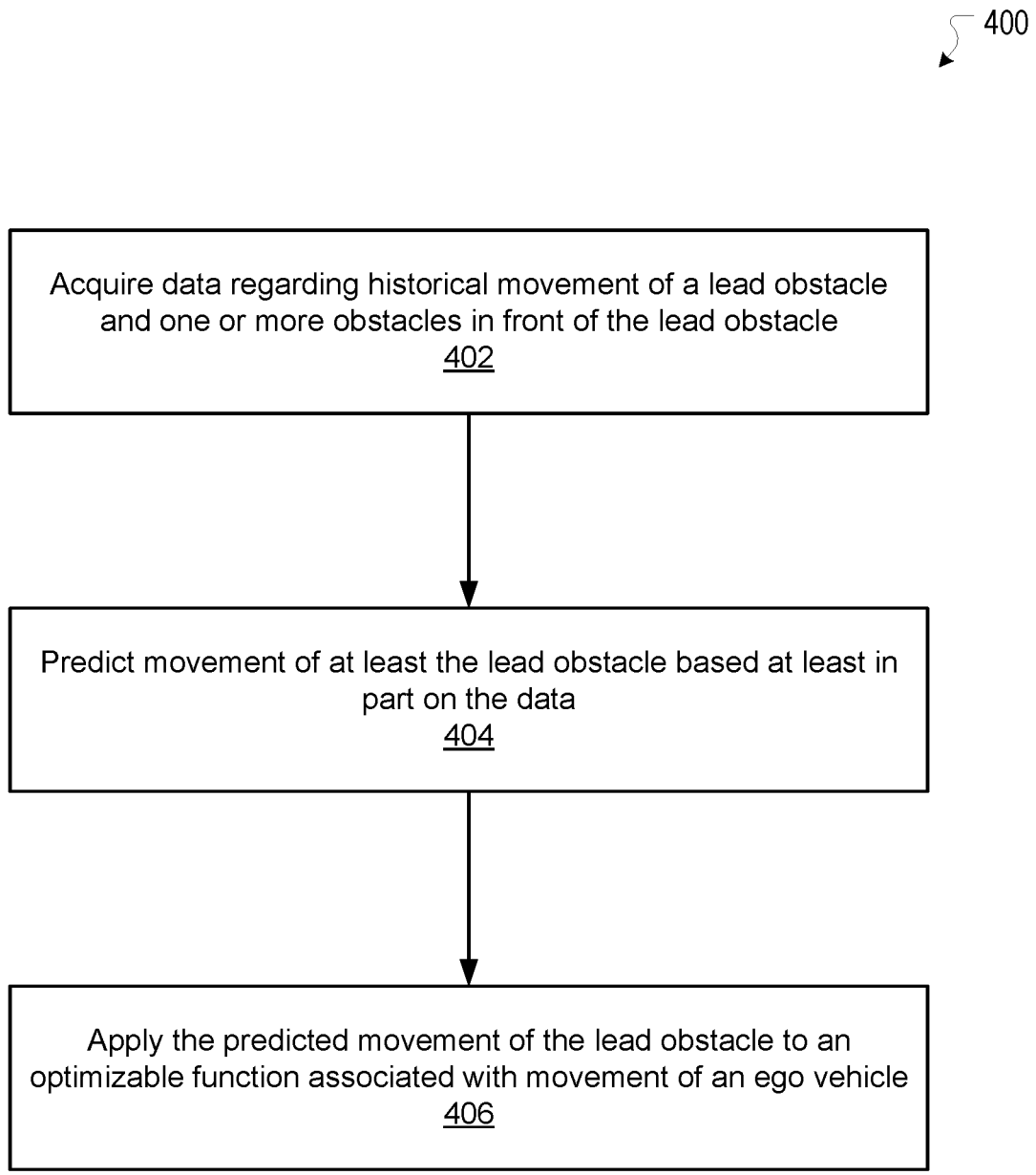
FIG. 4 illustrates an example method associated with predictive planning, according to embodiments of the present technology.

FIG. 4 illustrates an example method 400, according to an embodiment of the present technology. At block 402, the method 400 can acquire data regarding historical movement of a lead obstacle and one or more obstacles in front of the lead obstacle. At block 404, the method 400 can predict movement of at least the lead obstacle based at least in part on the data. At block 406, the method 400 can apply the predicted movement of the lead obstacle to an optimizable function associated with movement of an ego vehicle. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Adaptive APB Distance

An autonomous system for navigation of a vehicle (e.g., ego vehicle), such as a truck, can plan vehicle navigation with a focus on safety. Navigation planning can consider the distance between an ego vehicle and another obstacle directly in front of (leading) the ego vehicle. In conventional planning systems, a following distance can be determined to ensure a certain amount of separation between the ego vehicle and the lead obstacle (e.g., lead vehicle) so that, in the event of sudden deceleration by the lead obstacle, the ego vehicle has sufficient time to avoid collision. The determination of the following distance can be generated by a particular rule (or formula). However, use of a rule in conventional planning systems to determine a following distance may not adequately consider changed conditions in dynamic traffic conditions. Further, conventional planning systems may not adequately account for considerations in addition to safety. Namely, considerations relating to fuel efficiency and driving comfort are often neglected. As a result, conventional planning systems often dictate vehicle movement that is suboptimal.

The present technology provides improved approaches for adaptively determining an optimized preferred following distance, such as an adapted automatic preventative braking (APB) distance, between an ego vehicle and a lead obstacle (e.g., lead vehicle) directly in front of the ego vehicle. In the present technology, APB distance can be adapted for a particular situation. The adapted APB distance can be based on an optimizable objective function, such as a cost function. The objective function can include a first term associated with driving comfort (e.g., jerkiness) of the ego vehicle and a second term associated with economy (e.g., fuel inefficiency). The first term and the second term can be functions of various information relating to the particular situation. An adapted APB distance can be determined based on minimization of the objective function. Planned movement of the ego vehicle can be determined based on the adapted APB distance. Because determination of the adapted APB distance accounts for jerkiness and fuel inefficiency, planned movement of the ego vehicle can reflect optimal driving behavior, reducing excessive braking and throttling and related disadvantages associated with driving comfort and economy. The planned movement of the ego vehicle can advantageously resemble human-style driving in which following distances can vary as circumstances warrant. These and other inventive features and related advantages of the various embodiments of the present technology are discussed in more detail herein.

Figure 5:
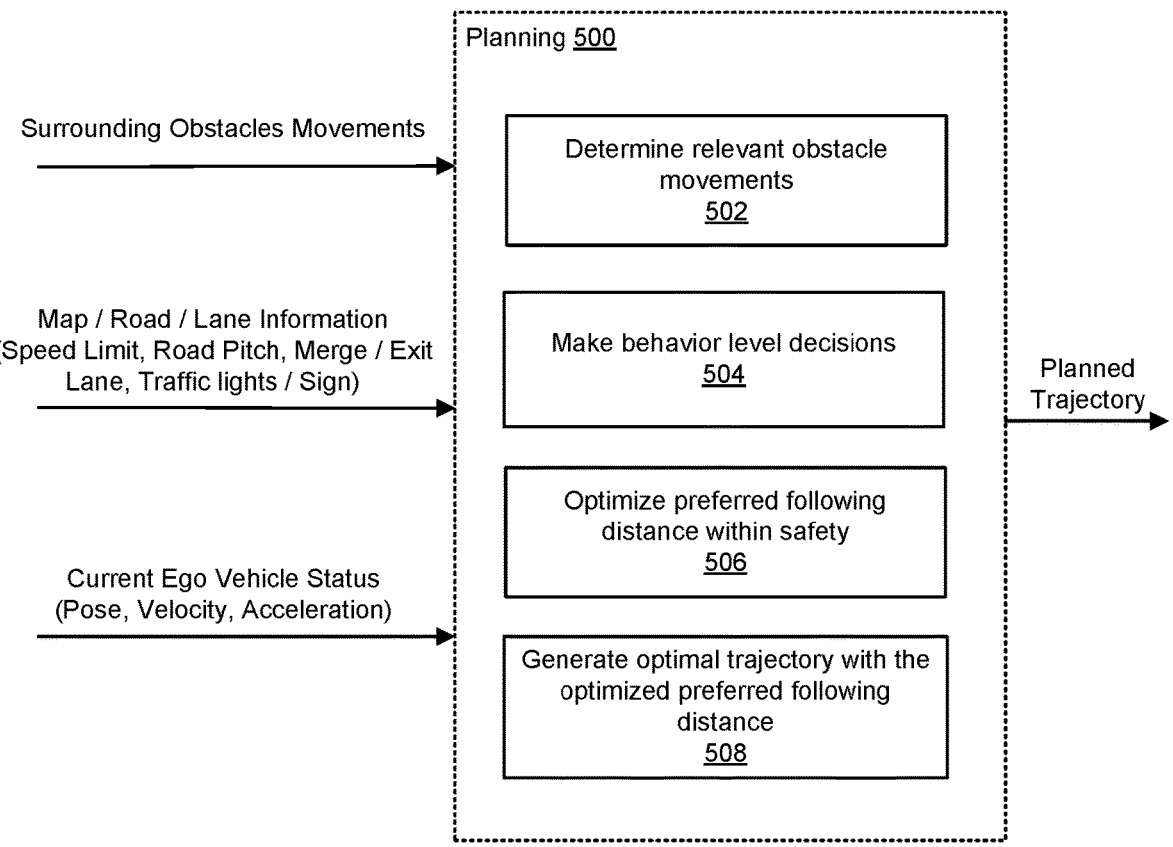
FIG. 5 illustrates an example planning module associated with optimized preferred following distance, according to embodiments of the present technology.

FIG. 5 illustrates an example planning module 500 of an autonomous system for navigation of a vehicle (e.g., ego vehicle), according to some embodiments of the present technology. In some embodiments, the planning module 500 can be implemented in an autonomous system of any type of vehicle, such as an autonomous vehicle. The planning module 500 can generate a planned trajectory for an ego vehicle based at least in part on an optimized preferred following distance that is adaptively generated. References to an adapted APB distance herein are merely examples of a type of optimized preferred following distance. In some embodiments, the planning module 500 can apply to another type of optimized preferred following distance apart from adapted APB distance. In some embodiments, the planning module 500 and the planning module 100 can be merged or combined as parallel functions of an integrated planning module of the autonomous system. In some embodiments, the planning module 500 can utilize the operations and determinations of the planning module 100. In some embodiments, the planning module 100 can utilize the operations and determinations of the planning module 500.

In some embodiments, some or all of the functionality performed by the planning module 500 may be performed by one or more computing systems implemented in a vehicle. In some embodiments, some or all of the functionality performed by the planning module 500 may be performed by one or more backend computing systems. In some embodiments, some or all of the functionality performed by the planning module 500 may be performed by one or more computing systems associated with (e.g., carried by) one or more users riding in a vehicle. In some embodiments, some or all data processed and/or stored by the planning module 500 can be stored in a data store (e.g., local to the planning module 500) or other storage system (e.g., cloud storage remote from the planning module 500). The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the planning module 500 can be implemented in any suitable combinations. Functionality and operation of the planning module 500 or variations thereof may be further discussed herein or shown in other figures.

At block 502, the planning module 500 can determine movement and relevance of obstacles (or objects) in an environment of a vehicle. The operations and functionality of block 502 are substantially the same as the operations and functionality of block 102.

At block 504, the planning module 500 can make behavior level decisions. The operations and functionality of block 504 are substantially the same as the operations and functionality of block 104.

At block 506, the planning module 500 can perform an optimization to generate an optimized preferred following distance. A preferred following distance that is not optimized can be determined by any suitable technique. In some embodiments, the preferred following distance can be an APB distance.

Figure 6:
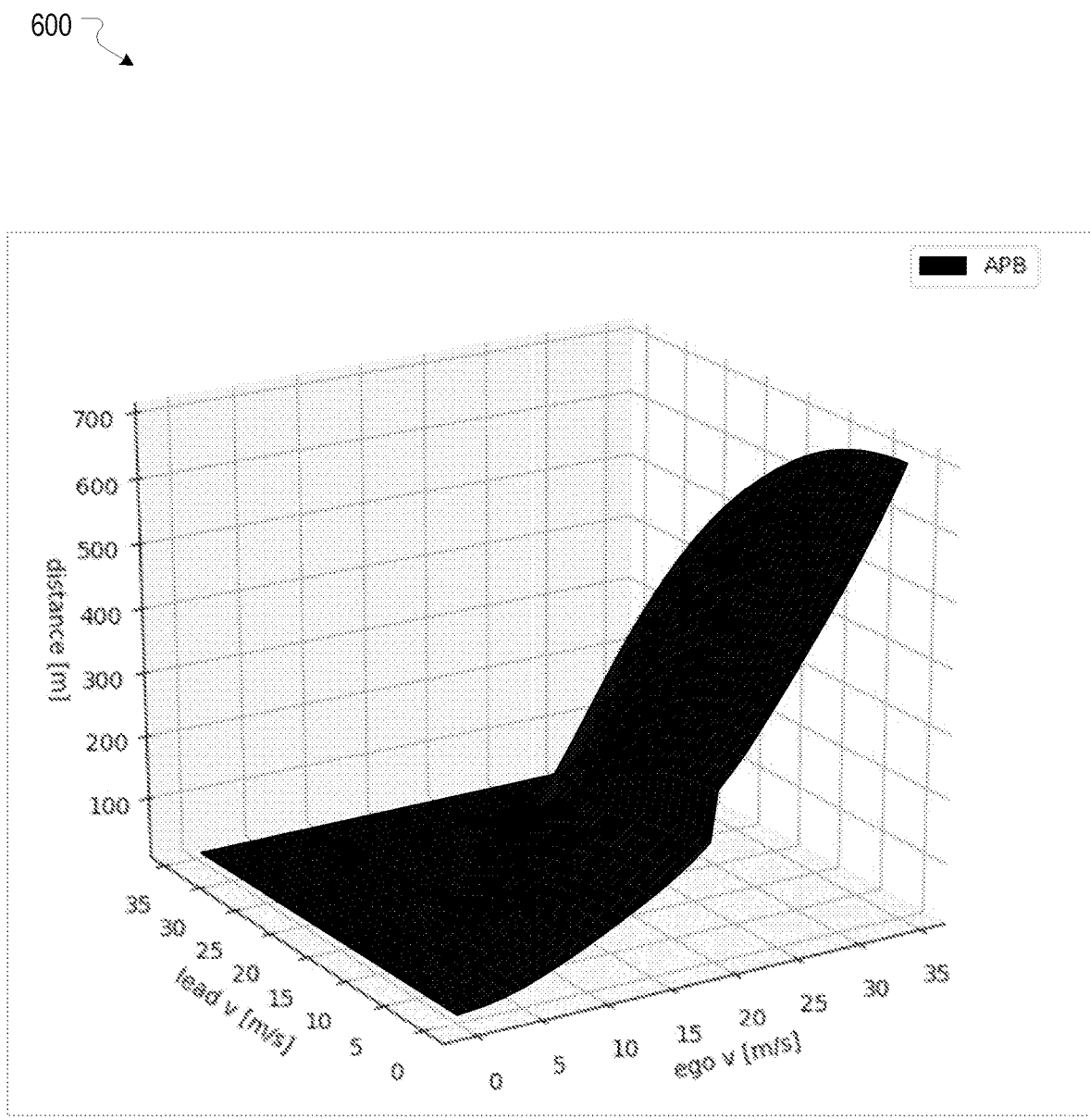
FIG. 6 illustrates a plot associated with APB distance, according to embodiments of the present technology.

APB distance can be determined by the following:

$$\left[\left[v_0 T + \frac{1}{2} a_0 T^2 - \frac{1}{6} j_{max} T^3\right] + \frac{\left(v_0 + a_0 T - \frac{1}{2} j_{max} T^2\right)^2}{2|a_{min,brake}|} - \frac{v_f^2}{2|a_{max,brake}|}\right]_+,$$

where $v_0$ is initial velocity of an ego vehicle; T is time; $v_f$ is obstacle velocity; $a_0$ is initial acceleration of the ego vehicle; $j_{max}$ is maximum jerk value of the ego vehicle; $a_{min,brake}$ is minimum deceleration of the ego vehicle; and, $a_{max,brake}$ is maximum deceleration of an obstacle ahead of the ego vehicle. The values of $j_{max}$, $a_{min,brake}$ and $a_{max,brake}$ can be predetermined parameter values that reflect vehicle configurations. The APB distance is referenced in Shai Shalev-Shwartz, Shaked Shammah, and Amnon Shashua, "Vision Zero: Can Roadway Accidents be Eliminated without Compromising Traffic Throughput?," Mobileye, 2018, which is incorporated herein by reference. FIG. 6 is a plot 600 of APB distance. The plot 600 is based on velocity of an ego vehicle along the x-axis, velocity of a lead obstacle along the y-axis, and APB distance along the z-axis. For example, as can be observed from the plot 600, relatively low values of ego vehicle velocity and lead obstacle velocity are associated with relatively low values of APB distance. As another example, relatively high values of ego vehicle velocity and relatively low values of lead obstacle velocity are associated with relatively high values of APB distance.

The planning module 500 can adaptively generate APB distances that are optimized, or adapted, in response to considerations relating to driving comfort, economy, and safety. The planning module 500 can generate and utilize adapted APB distances, instead of APB distances, so that the ego vehicle can avoid abrupt changes in movement due to dynamic road conditions. In contrast to APB distances, generation of adapted APB distances can be associated with and based on an objective function. The objective function can include a plurality of terms. For example, the terms can be summed in the objective function. In some embodiments, the plurality of terms can include a first term relating to driving comfort and a second term related to economy. For example, the first term can be associated with jerkiness and the second term can be associated with fuel efficiency (or fuel inefficiency). In some embodiments, additional factors relating to driving comfort apart from jerkiness can be evaluated in the objective function. In some embodiments, additional factors relating to economy apart from fuel efficiency can be evaluated in the objective function.

In some embodiments, the objective function associated with adapted APB distance between an ego vehicle and a lead obstacle ahead of the ego vehicle can be specified as follows:

$$\mathrm{argmin}_{apb\_distance} f_{jerkiness}(\text{current situation info}) + f_{fuel\ efficiency}(\text{current situation info}),$$

s.t apb_distance>=min_safe_distance, where $f_{jerkiness}$ and $f_{fuel\ efficiency}$ are respective functions of current situation info; current situation info can be any relevant information about the current situation involving the ego vehicle and the lead obstacle; and, min_safe_distance is a smallest distance that maintains safety between the ego vehicle and the lead obstacle.

The information about the current situation, current situation info, can include measured data or calculated data. The information about the current situation can include, for example, the positions, velocities, and accelerations of the ego vehicle, a lead obstacle directly in front of the ego vehicle, and other obstacles in front of the lead obstacle. In some embodiments, the velocity of the lead obstacle can be the predicted velocity (or speed) of the lead obstacle as discussed in connection with FIGS. 1-4.

The smallest distance that maintains safety, min_safe_distance, can vary based on velocity of the ego vehicle and velocity of the lead obstacle. For example, if a lead obstacle is traveling much faster than an ego vehicle, then the smallest distance that maintains safety can be a relatively smaller value. As another example, if a lead obstacle is traveling much slower than an ego vehicle, then the smallest distance that maintains safety can be a relatively larger value. In some embodiments, min_safe_distance can be less than or equal to an adapted APB distance.

Adapted APB distances can be generated based on minimization of the objective function associated with adapted APB distances. Minimization of the objective function can be associated with determination of an adapted APB distance between an ego vehicle and a lead obstacle where driving comfort factors and economy factors are optimized. For example, driving comfort factors can include jerkiness of the ego vehicle and economy factors can include fuel inefficiency of the ego vehicle.

At block 508, the planning module 500 can generate a planned trajectory for the ego vehicle. The planned trajectory can be based on current ego vehicle status, such as pose, velocity, and acceleration of the ego vehicle. In addition, the planned trajectory can be based on an adapted APB distance. The adapted APB distance constitutes an optimized APB distance that advantageously accounts for driving comfort and fuel efficiency in addition to safety. The planned trajectory also can be based on other optimizations, such as optimized ego vehicle movement based on predictive planning in relation to lead obstacle movement as discussed in connection with FIGS. 1-4. The planned trajectory can be provided to a control function of the autonomous system to command actuators of the ego vehicle to execute movement of the ego vehicle as planned.

Optimized movement of the ego vehicle based on the planning module 500 can be illustrated in various ways. For example, assume a lead obstacle cuts in front of an ego vehicle in an ego lane. If use of an APB distance is to be maintained as would be true in a conventional autonomous system, the ego vehicle would need to suddenly decelerate. Sudden deceleration would engender significant costs in terms of compromised driving comfort and poor fuel efficiency. Advantageously, movement for the ego vehicle as planned by the planning module 500 can avoid such costs by transitioning from use of an APB distance before the cut in to use of an adapted APB distance during and after the cut in. Based on minimization of the objective function, the planning module 500 can generate and utilize an adapted APB distance that is less than an APB distance. The adapted APB distance as generated is safe when it remains greater than or equal to a minimum safety distance. Utilization of the adapted APB distance enables the ego vehicle to avoid significant braking in response to the cut in and significant throttling after the cut in to return to normal traffic speed. Accordingly, driving comfort (e.g., reduction of jerkiness) and fuel efficiency of the ego vehicle are improved through the adapted APB distance, while safety is maintained.

In another example, an adapted APB distance can be smaller than an APB distance. Assume an ego vehicle is following a lead obstacle in an ego lane when another obstacle cuts into the ego lane directly in front of the ego vehicle and behind the obstacle that was previously leading. The other obstacle that cuts in then becomes the lead obstacle. The planning module 500 can switch from an APB distance to an adapted APB distance in response to the cut in. Minimization of the objective function associated with adapted APB distance in this situation can avoid the relatively large deceleration by the ego vehicle that otherwise would be executed by a conventional autonomous system of the ego vehicle. Such relatively large deceleration would increase the value of the objective function associated with adapted APB distance, resulting in penalized movement. Instead, minimization of the objective function can result in ego vehicle movement with more moderate deceleration (or no deceleration) as traffic conditions warrant. Such ego vehicle movement with more moderate deceleration can be associated with an adapted APB distance that is smaller than an APB distance that otherwise would be generated. The adapted APB distance as generated is safe when it satisfies the minimum safe distance condition. In this example, as a consequence of the objective function, motion of the ego vehicle is smoother. The use of brake and throttle is optimally reduced, achieving improvements in driving comfort and fuel efficiency while maintaining safety. While the adapted APB distance is a relatively smaller value near the time of the cut in, the adapted APB distance will gradually increase based on minimization of the objective function. In some cases, the distance between the ego vehicle and the lead obstacle can gradually return to an APB distance.

In yet another example, an adapted APB distance can become larger than an APB distance. Assume that a first obstacle is traveling in front of a lead obstacle in an ego lane, and the lead obstacle is traveling in front of an ego vehicle in the ego lane. Assume further that the lead obstacle is increasing velocity but the first obstacle is traveling at a steady lower velocity. In this situation, a conventional autonomous system can increase the velocity of the ego vehicle to maintain an APB distance with the lead obstacle. Further, as the lead obstacle approaches the first obstacle, the lead obstacle can decelerate, in turn causing the ego vehicle to also decelerate so that the APB distance is maintained. Such movement by the ego vehicle, as planned by a conventional autonomous system, can result in excessive throttling and braking, implicating significant costs in driving comfort and fuel efficiency. In contrast, the planning module 500 can avoid such costs by utilization of an adapted APB. Based on minimization of the objective function associated with adapted APB distance, ego vehicle movement can utilize an adapted APB distance that is larger than the APB distance as the lead vehicle is increasing velocity in this example. Ego vehicle movement can be planned based on predicted movement (e.g., predicted speed) of the lead obstacle that accounts for movement of the first obstacle as described in connection with FIGS. 1-4. Accordingly, despite its initial increase in velocity, the velocity of the lead obstacle can be predicted to slow as it approaches the first obstacle. As a result, the planning module 500 can generate an adapted APB distance that is larger than the APB distance so that the ego vehicle is spared the acceleration and deceleration exhibited by the lead obstacle that would reduce driving comfort and fuel efficiency.

The foregoing are merely examples of the function and operation of the planning module 500. The planning module 500 can be utilized in other situations to generate adapted APB values that improve driving performance and economy while preserving safety. Many variations are possible.

Figure 7:
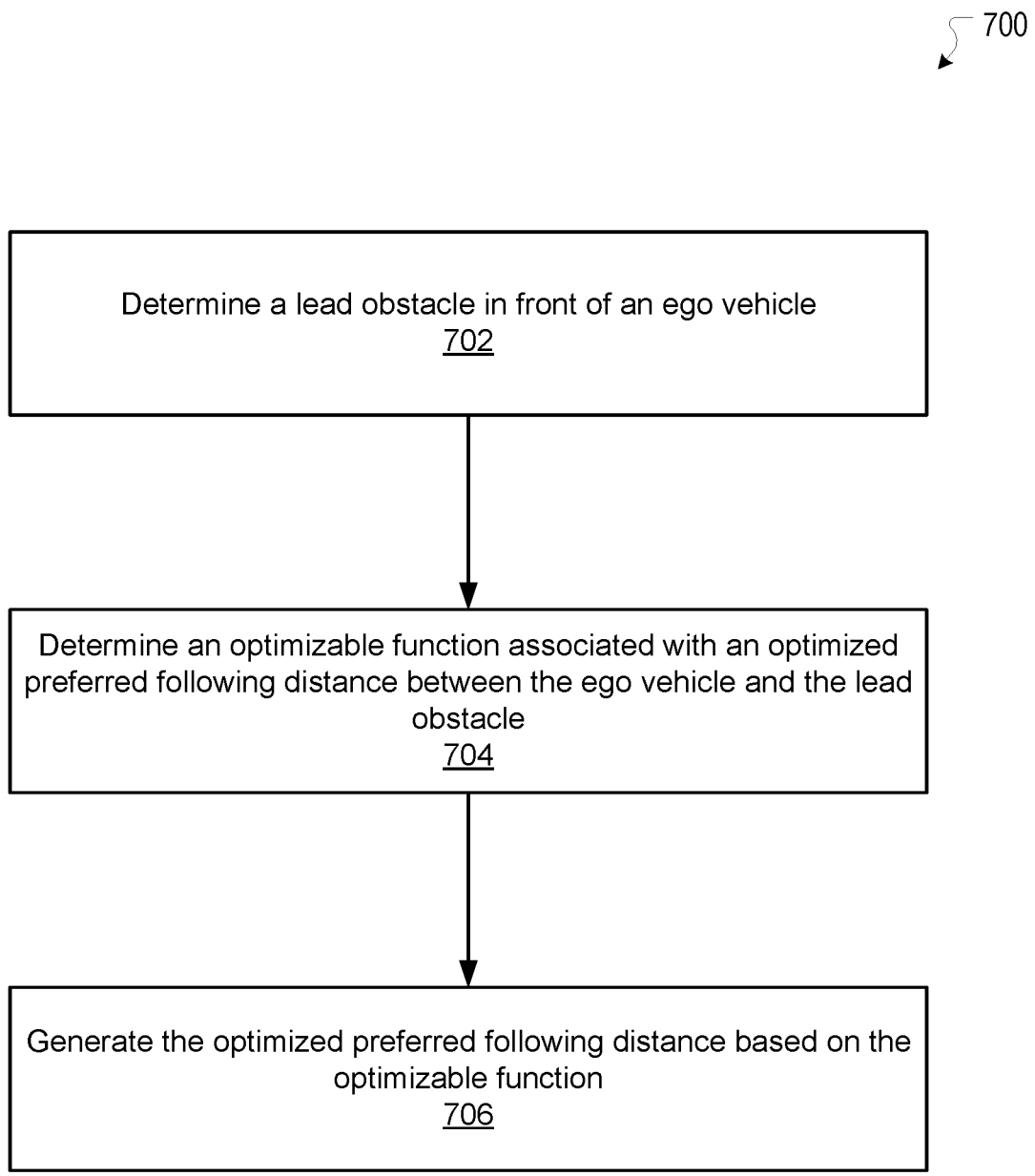
FIG. 7 illustrates an example method associated with optimized preferred following distance, according to embodiments of the present technology.

FIG. 7 illustrates an example method 700, according to an embodiment of the present technology. At block 702, the method 700 can determine a lead obstacle in front of an ego vehicle. At block 704, the method 700 can determine an optimizable function associated with an optimized preferred following distance between the ego vehicle and the lead obstacle. At block 706, the method 700 can generate the optimized preferred following distance based on the optimizable function. Many variations to the example method are possible. It should be appreciated that there can be additional, fewer, or alternative steps performed in similar or alternative orders, or in parallel, within the scope of the various embodiments discussed herein unless otherwise stated.

It is contemplated that there can be many other uses, applications, and/or variations associated with the various embodiments of the present technology. For example, various embodiments of the present technology can learn, improve, and/or be refined over time.

Example Implementations

Figure 8:
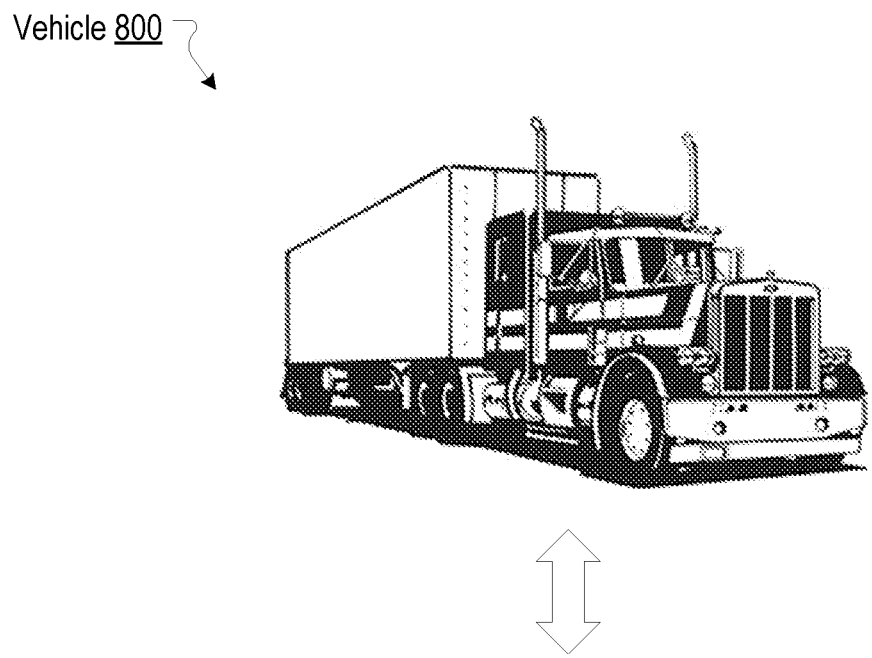
FIG. 8 illustrates an example vehicle, according to embodiments of the present technology.

FIG. 8 illustrates a vehicle 800 including an autonomous system 810, according to various embodiments of the present technology. The functionality and operation of the present technology, including the autonomous system 810, can be implemented in whole or in part by the vehicle 800. The present technology can cause desired control and navigation of the vehicle 800, as described herein. In some embodiments, the vehicle 800 is a truck, which can include a trailer. The truck can be of any size (e.g., medium truck, heavy truck, very heavy truck, etc.) or weight (e.g., greater than 14,000 pounds, greater than 26,000 pounds, greater than 70,000 pounds, etc.). The autonomous system 810 of the vehicle 800 can support and execute various modes of navigation of the vehicle 800. The autonomous system 810 can support and execute an autonomous driving mode, a semi-autonomous driving mode, and a driver assisted driving mode of the vehicle 800. The autonomous system 810 also can enable a manual driving mode. For operation of the vehicle 800, the autonomous system 810 can execute or enable one or more of the autonomous driving mode, the semi-autonomous driving mode, the driver assisted driving mode, and the manual driving mode, and selectively transition among the driving modes based on a variety of factors, such as operating conditions, vehicle capabilities, and driver preferences.

In some embodiments, the autonomous system 810 can include, for example, a perception module 812, a localization module 814, a prediction and planning module 816, and a control module 818. The functionality of the perception module 812, the localization module 814, the prediction and planning module 816, and the control module 818 of the autonomous system 810 are described in brief for purposes of illustration. The components (e.g., modules, elements, etc.) shown in this figure and all figures herein, as well as their described functionality, are exemplary only. Other implementations of the present technology may include additional, fewer, integrated, or different components and related functionality. Some components and related functionality may not be shown or described so as not to obscure relevant details. In various embodiments, one or more of the functionalities described in connection with the autonomous system 810 can be implemented in any suitable combinations.

The perception module 812 can receive and analyze various types of data about an environment in which the vehicle 800 is located. Through analysis of the various types of data, the perception module 812 can perceive the environment of the vehicle 800 and provide the vehicle 800 with critical information so that planning of navigation of the vehicle 800 is safe and effective. For example, the perception module 812 can determine the pose, trajectories, size, shape, and type of obstacles in the environment of the vehicle 800. Various models, such as machine learning models, can be utilized in such determinations.

The various types of data received by the perception module 812 can be any data that is supportive of the functionality and operation of the present technology. For example, the data can be attributes of the vehicle 800, such as location, velocity, acceleration, weight, and height of the vehicle 800. As another example, the data can relate to topographical features in the environment of the vehicle 800, such as traffic lights, road signs, lane markers, landmarks, buildings, structures, trees, curbs, bodies of water, etc. As yet another example, the data can be attributes of dynamic obstacles in the surroundings of the vehicle 800, such as location, velocity, acceleration, size, type, and movement of vehicles, persons, animals, road hazards, etc.

Sensors can be utilized to capture the data. The sensors can include, for example, cameras, radar, LiDAR (light detection and ranging), GPS (global positioning system), IMUs (inertial measurement units), and sonar. The sensors can be appropriately positioned at various locations (e.g., front, back, sides, top, bottom) on or in the vehicle 800 to optimize the collection of data. The data also can be captured by sensors that are not mounted on or in the vehicle 800, such as data captured by another vehicle (e.g., another truck) or by non-vehicular sensors located in the environment of the vehicle 800.

The localization module 814 can determine the pose of the vehicle 800. Pose of the vehicle 800 can be determined in relation to a map of an environment in which the vehicle 800 is traveling. Based on data received by the vehicle 800, the localization module 814 can determine distances and directions of features in the environment of the vehicle 800. The localization module 814 can compare features detected in the data with features in a map (e.g., HD map) to determine the pose of the vehicle 800 in relation to the map. The features in the map can include, for example, traffic lights, crosswalks, road signs, lanes, road connections, stop lines, etc. The localization module 814 can allow the vehicle 800 to determine its location with a high level of precision that supports optimal navigation of the vehicle 800 through the environment.

The prediction and planning module 816 can plan motion of the vehicle 800 from a start location to a destination location. The prediction and planning module 816 can generate a route plan, which reflects high level objectives, such as selection of different roads to travel from the start location to the destination location. The prediction and planning module 816 also can generate a behavioral plan with more local focus. For example, a behavioral plan can relate to various actions, such as changing lanes, merging onto an exit lane, turning left, passing another vehicle, etc. In addition, the prediction and planning module 816 can generate a motion plan for the vehicle 800 that navigates the vehicle 800 in relation to the predicted location and movement of other obstacles so that collisions are avoided. The prediction and planning module 816 can perform its planning operations subject to certain constraints. The constraints can be, for example, to ensure safety, to minimize costs, and to enhance comfort.

Based on output from the prediction and planning module 816, the control module 818 can generate control signals that can be communicated to different parts of the vehicle 800 to implement planned vehicle movement. The control module 818 can provide control signals as commands to actuator subsystems of the vehicle 800 to generate desired movement. The actuator subsystems can perform various functions of the vehicle 800, such as braking, acceleration, steering, signaling, etc.

The autonomous system 810 can include a data store 820. The data store 820 can be configured to store and maintain information that supports and enables operation of the vehicle 800 and functionality of the autonomous system 810. The information can include, for example, instructions to perform the functionality of the autonomous system 810, data captured by sensors, data received from a remote computing system, parameter values reflecting vehicle states, map data, machine learning models, algorithms, vehicle operation rules and constraints, navigation plans, etc.

The autonomous system 810 of the vehicle 800 can communicate over a communications network with other computing systems to support navigation of the vehicle 800. The communications network can be any suitable network through which data can be transferred between computing systems. Communications over the communications network involving the vehicle 800 can be performed in real time (or near real time) to support navigation of the vehicle 800.

The autonomous system 810 can communicate with a remote computing system (e.g., server, server farm, peer computing system) over the communications network. The remote computing system can include an autonomous system, and perform some or all of the functionality of the autonomous system 810. In some embodiments, the functionality of the autonomous system 810 can be distributed between the vehicle 800 and the remote computing system to support navigation of the vehicle 800. For example, some functionality of the autonomous system 810 can be performed by the remote computing system and other functionality of the autonomous system 810 can be performed by the vehicle 800. In some embodiments, a fleet of vehicles including the vehicle 800 can communicate data captured by the fleet to a remote computing system controlled by a provider of fleet management services. The remote computing system in turn can aggregate and process the data captured by the fleet. The processed data can be selectively communicated to the fleet, including vehicle 800, to assist in navigation of the fleet as well as the vehicle 800 in particular. In some embodiments, the autonomous system 810 of the vehicle 800 can directly communicate with a remote computing system of another vehicle. For example, data captured by the other vehicle can be provided to the vehicle 800 to support navigation of the vehicle 800, and vice versa. The vehicle 800 and the other vehicle can be owned by the same entity in some instances. In other instances, the vehicle 800 and the other vehicle can be owned by different entities.

In various embodiments, the functionalities described herein with respect to the present technology can be implemented, in part or in whole, as software, hardware, or any combination thereof. In some cases, the functionalities described with respect to the present technology can be implemented, in part or in whole, as software running on one or more computing devices or systems. In a further example, the functionalities described with respect to the present technology can be implemented using one or more computing devices or systems that include one or more servers, such as network servers or cloud servers. It should be understood that there can be many variations or other possibilities.

Figure 9:
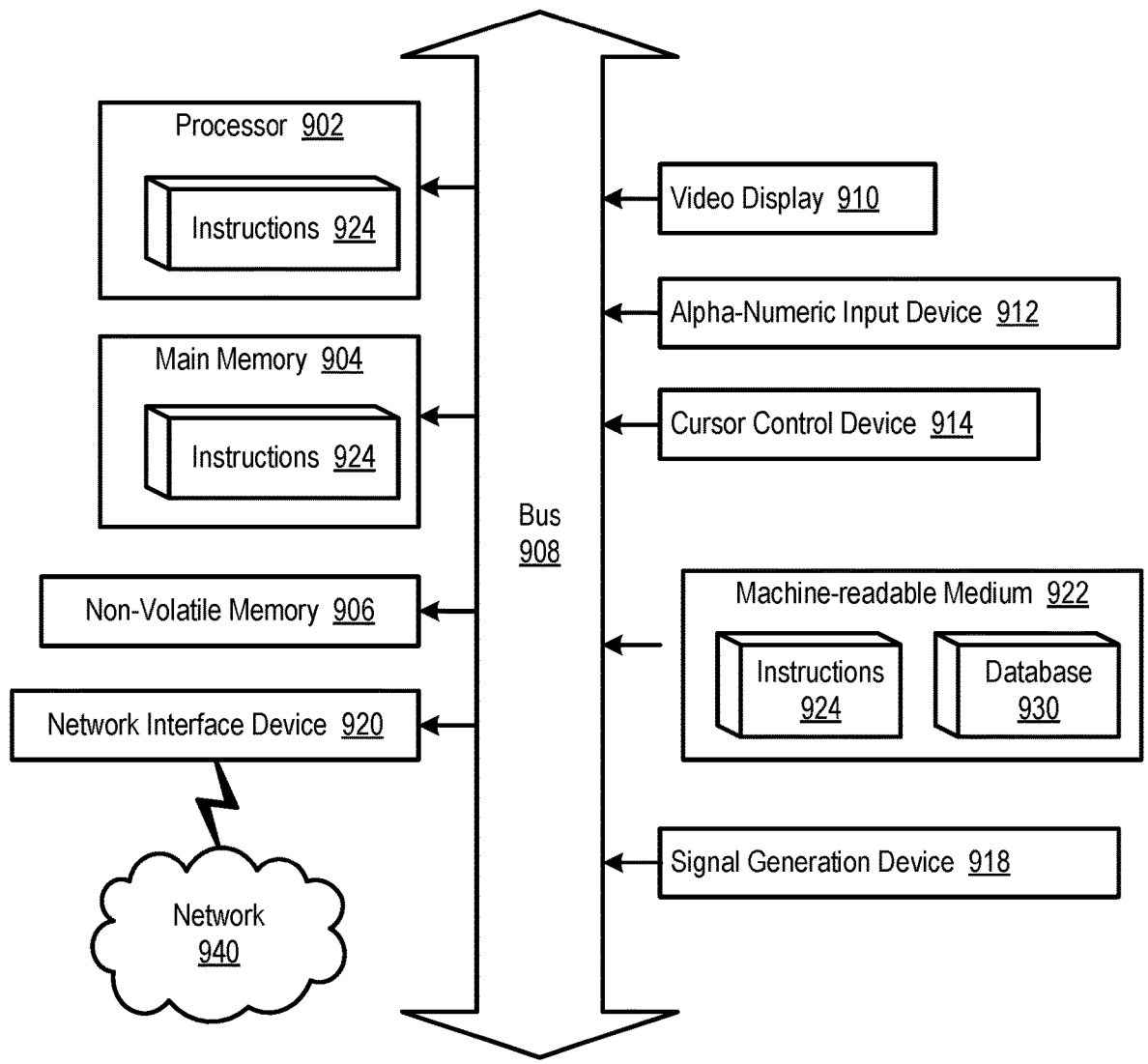
FIG. 9 illustrates an example computing system, according to embodiments of the present technology.

FIG. 9 illustrates an example of a computer system 900 that may be used to implement one or more of the embodiments of the present technology. The computer system 900 can be included in a wide variety of local and remote machine and computer system architectures and in a wide variety of network and computing environments that can implement the functionalities of the present technology. The computer system 900 includes sets of instructions 924 for causing the computer system 900 to perform the functionality, features, and operations discussed herein. The computer system 900 may be connected (e.g., networked) to other machines and/or computer systems. In a networked deployment, the computer system 900 may operate in the capacity of a server or a client machine in a client-server network environment, or as a peer machine in a peer-to-peer (or distributed) network environment.

The computer system 900 includes a processor 902 (e.g., a central processing unit (CPU), a graphics processing unit (GPU), or both), a main memory 904, and a nonvolatile memory 906 (e.g., volatile RAM and non-volatile RAM, respectively), which communicate with each other via a bus 908. In some embodiments, the computer system 900 can be a desktop computer, a laptop computer, personal digital assistant (PDA), or mobile phone, for example. In one embodiment, the computer system 900 also includes a video display 910, an alphanumeric input device 912 (e.g., a keyboard), a cursor control device 914 (e.g., a mouse), a drive unit 919, a signal generation device 918 (e.g., a speaker) and a network interface device 920.

In one embodiment, the video display 910 includes a touch sensitive screen for user input. In one embodiment, the touch sensitive screen is used instead of a keyboard and mouse. The disk drive unit 919 includes a machine-readable medium 922 on which is stored one or more sets of instructions 924 (e.g., software) embodying any one or more of the methodologies, functions, or operations described herein. The instructions 924 can also reside, completely or at least partially, within the main memory 904 and/or within the processor 902 during execution thereof by the computer system 900. The instructions 924 can further be transmitted or received over a network 940 via the network interface device 920. In some embodiments, the machine-readable medium 922 also includes a database 930.

Volatile RAM may be implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system that maintains data even after power is removed from the system. The non-volatile memory 906 may also be a random access memory. The non-volatile memory 906 can be a local device coupled directly to the rest of the components in the computer system 900. A non-volatile memory that is remote from the system, such as a network storage device coupled to any of the computer systems described herein through a network interface such as a modem or Ethernet interface, can also be used.

While the machine-readable medium 922 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present technology. Examples of machine-readable media (or computer-readable media) include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 900 to perform any one or more of the processes and features described herein.

In general, routines executed to implement the embodiments of the invention can be implemented as part of an operating system or a specific application, component, program, object, module, or sequence of instructions referred to as "programs" or "applications." For example, one or more programs or applications can be used to execute any or all of the functionality, techniques, and processes described herein. The programs or applications typically comprise one or more instructions set at various times in various memory and storage devices in the machine and that, when read and executed by one or more processors, cause the computing system 600 to perform operations to execute elements involving the various aspects of the embodiments described herein.

The executable routines and data may be stored in various places, including, for example, ROM, volatile RAM, non-volatile memory, and/or cache memory. Portions of these routines and/or data may be stored in any one of these storage devices. Further, the routines and data can be obtained from centralized servers or peer-to-peer networks. Different portions of the routines and data can be obtained from different centralized servers and/or peer-to-peer networks at different times and in different communication sessions, or in a same communication session. The routines and data can be obtained in entirety prior to the execution of the applications. Alternatively, portions of the routines and data can be obtained dynamically, just in time, when needed for execution. Thus, it is not required that the routines and data be on a machine-readable medium in entirety at a particular instance of time.

While embodiments have been described fully in the context of computing systems, those skilled in the art will appreciate that the various embodiments are capable of being distributed as a program product in a variety of forms, and that the embodiments described herein apply equally regardless of the particular type of machine- or computer-readable media used to actually affect the distribution.

Alternatively, or in combination, the embodiments described herein can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

For purposes of explanation, numerous specific details are set forth in order to provide a thorough understanding of the description. It will be apparent, however, to one skilled in the art that embodiments of the technology can be practiced without these specific details. In some instances, modules, structures, processes, features, and devices are shown in block diagram form in order to avoid obscuring the description or discussed herein. In other instances, functional block diagrams and flow diagrams are shown to represent data and logic flows. The components of block diagrams and flow diagrams (e.g., modules, engines, blocks, structures, devices, features, etc.) may be variously combined, separated, removed, reordered, and replaced in a manner other than as expressly described and depicted herein.

Reference in this specification to "one embodiment," "an embodiment," "other embodiments," "another embodiment," "in various embodiments," "in an example," "in one implementation," or the like means that a particular feature, design, structure, or characteristic described in connection with the embodiment is included in at least one embodiment of the technology. The appearances of, for example, the phrases "according to an embodiment," "in one embodiment," "in an embodiment," "in various embodiments," or "in another embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments but also variously omitted in other embodiments. Similarly, various features are described which may be preferences or requirements for some embodiments but not other embodiments.

Although embodiments have been described with reference to specific exemplary embodiments, it will be evident that the various modifications and changes can be made to these embodiments. Accordingly, the specification and drawings are to be regarded in an illustrative sense rather than in a restrictive sense. The foregoing specification provides a description with reference to specific exemplary embodiments. It will be evident that various modifications can be made thereto without departing from the broader spirit and scope as set forth in the following claims. The specification and drawings are, accordingly, to be regarded in an illustrative sense rather than a restrictive sense.

Although some of the drawings illustrate a number of operations or method steps in a particular order, steps that are not order dependent may be reordered and other steps may be combined or omitted. While some reordering or other groupings are specifically mentioned, others will be apparent to those of ordinary skill in the art and so do not present an exhaustive list of alternatives. Moreover, it should be recognized that the stages could be implemented in hardware, firmware, software, or any combination thereof.

It should also be understood that a variety of changes may be made without departing from the essence of the invention. Such changes are also implicitly included in the description. They still fall within the scope of this invention. It should be understood that this technology is intended to yield a patent covering numerous aspects of the invention, both independently and as an overall system, and in method, computer readable medium, and apparatus modes.

Further, each of the various elements of the invention and claims may also be achieved in a variety of manners. This technology should be understood to encompass each such variation, be it a variation of an embodiment of any apparatus (or system) embodiment, a method or process embodiment, a computer readable medium embodiment, or even merely a variation of any element of these.

Further, the use of the transitional phrase "comprising" is used to maintain the "open-end" claims herein, according to traditional claim interpretation. Thus, unless the context requires otherwise, it should be understood that the term "comprise" or variations such as "comprises" or "comprising," are intended to imply the inclusion of a stated element or step or group of elements or steps, but not the exclusion of any other element or step or group of elements or steps. Such terms should be interpreted in their most expansive forms so as to afford the applicant the broadest coverage legally permissible in accordance with the following claims.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the technology of the embodiments of the invention is intended to be illustrative, but not limiting, of the scope of the invention, which is set forth in the following claims.

What is claimed is:

1. A computer-implemented method comprising:
   acquiring, by a computing system, data regarding historical movement of a lead obstacle and one or more obstacles in front of the lead obstacle;
   predicting, by the computing system, movement of at least the lead obstacle based at least in part on the data;
   applying, by the computing system, the predicted movement of the lead obstacle to an optimizable function associated with movement of an ego vehicle, the optimizable function based at least in part on a combination of a safety term and a traffic term, wherein the safety term is weighted by a constant value and the traffic term is weighted by a value inversely related to a headway distance;
   generating, by the computing system, a plan for movement of the ego vehicle based on minimization of the optimizable function; and
   moving, by the computing system, the ego vehicle based on the plan.

2. The computer-implemented method of claim 1, wherein the predicted movement of the lead obstacle includes predicted speed of the lead obstacle.

3. The computer-implemented method of claim 1, wherein the predicting is based on a model that generates at least a speed profile of the lead obstacle.

4. The computer-implemented method of claim 3, wherein the model assumes that the lead obstacle and the one or more obstacles in front of the lead obstacle have the same velocity at the same location.

5. The computer-implemented method of claim 3, wherein the data includes distances and velocities of the lead obstacle and distances and velocities of the one or more obstacles in front of the lead obstacle over a duration of time, and the model is a learning based algorithm that is trained based on the data.

6. The computer-implemented method of claim 5, wherein the predicted movement of the lead obstacle is based on a function determined by the data, the predicted movement associated with a time following the duration of time.

7. The computer-implemented method of claim 1, wherein the safety term is based at least in part on a difference between a preferred following distance and an obstacle distance and the traffic term is based at least in part on a difference between a velocity of the ego vehicle and a traffic target speed.

8. The computer-implemented method of claim 1, wherein the lead obstacle and the one or more obstacles in front of the lead obstacle are vehicles traveling in an ego lane.

9. A system comprising:
   at least one processor; and
   a memory storing instructions that, when executed by the at least one processor, cause the system to perform operations comprising:
   acquiring data regarding historical movement of a lead obstacle and one or more obstacles in front of the lead obstacle;
   predicting movement of at least the lead obstacle based at least in part on the data;
   applying the predicted movement of the lead obstacle to an optimizable function associated with movement of an ego vehicle, the optimizable function based at least in part on a combination of a safety term and a traffic term, wherein the safety term is weighted by a constant value and the traffic term is weighted by a value inversely related to a headway distance;
   generating a plan for movement of the ego vehicle based on minimization of the optimizable function; and
   moving the ego vehicle based on the plan.

10. The system of claim 9, wherein the predicted movement of the lead obstacle includes predicted speed of the lead obstacle.

11. The system of claim 9, wherein the predicting is based on a model that generates at least a speed profile of the lead obstacle.

12. The system of claim 11, wherein the model assumes that the lead obstacle and the one or more obstacles in front of the lead obstacle have the same velocity at the same location.

13. The system of claim 11, wherein the data includes distances and velocities of the lead obstacle and distances and velocities of the one or more obstacles in front of the lead obstacle over a duration of time, and the model is a learning based algorithm that is trained based on the data.

14. The system of claim 13, wherein the predicted movement of the lead obstacle is based on a function determined by the data, the predicted movement associated with a time following the duration of time.

15. A non-transitory computer-readable storage medium including instructions that, when executed by at least one processor of a computing system, cause the computing system to perform operations comprising:
acquiring data regarding historical movement of a lead obstacle and one or more obstacles in front of the lead obstacle;
predicting movement of at least the lead obstacle based at least in part on the data; and
applying the predicted movement of the lead obstacle to an optimizable function associated with movement of an ego vehicle, the optimizable function based at least in part on a combination of a safety term and a traffic term, wherein the safety term is weighted by a constant value and the traffic term is weighted by a value inversely related to a headway distance;
generating a plan for movement of the ego vehicle based on minimization of the optimizable function; and
moving the ego vehicle based on the plan.

16. The non-transitory computer-readable storage medium of claim 15, wherein the predicted movement of the lead obstacle includes predicted speed of the lead obstacle.

17. The non-transitory computer-readable storage medium of claim 15, wherein the predicting is based on a model that generates at least a speed profile of the lead obstacle.

18. The non-transitory computer-readable storage medium of claim 17, wherein the model assumes that the lead obstacle and the one or more obstacles in front of the lead obstacle have the same velocity at the same location.

19. The non-transitory computer-readable storage medium of claim 17, wherein the data includes distances and velocities of the lead obstacle and distances and velocities of the one or more obstacles in front of the lead obstacle over a duration of time, and the model is a learning based algorithm that is trained based on the data.

20. The non-transitory computer-readable storage medium of claim 19, wherein the predicted movement of the lead obstacle is based on a function determined by the data, the predicted movement associated with a time following the duration of time.

* * * * *